6 Sheets—Sheet 1.

W. J. SQUIRE.
Machine for Making Netting.

No. 203,857. Patented May 21, 1878.

Witnesses.
Willard Eddy
John T. Peters

Inventor:
William J. Squire
by Theo. G. Ellis, Attorney.

N. PETERS, PHOTO-LITHOGRAPHER, WASHINGTON, D. C.

6 Sheets—Sheet 4.

W. J. SQUIRE.
Machine for Making Netting.

No. 203,857. Patented May 21, 1878.

W. J. SQUIRE.
Machine for Making Netting.

No. 203,857. Patented May 21, 1878.

Witnesses.
Willard Eddy.
John T. Peters

Inventor.
Wilbur J. Squire
by Theo. G. Ellis, Attorney

W. J. SQUIRE.
Machine for Making Netting.
No. 203,857. Patented May 21, 1878.
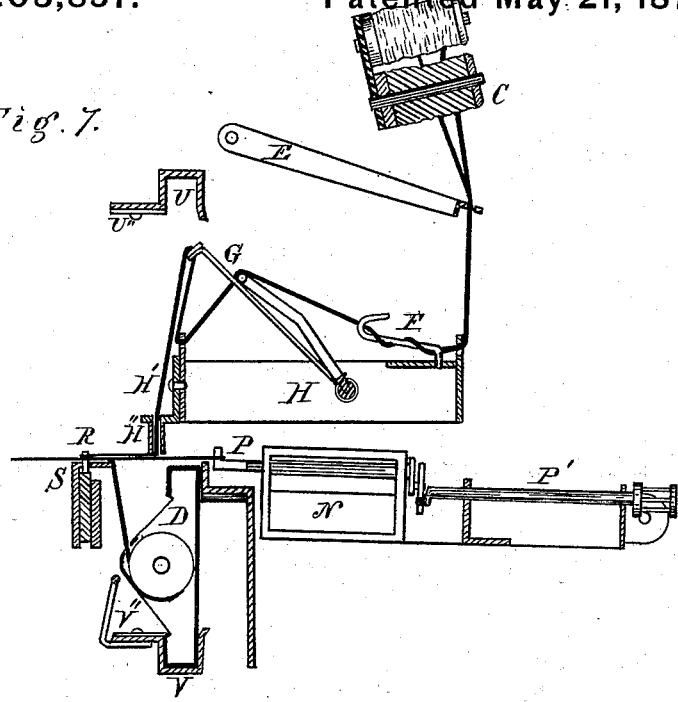
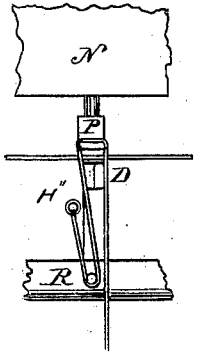
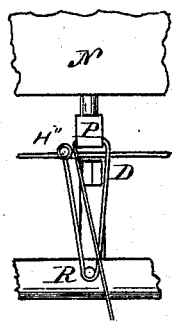
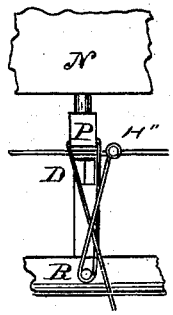
Witnesses.
Millard Eddy
John T. Peters
Inventor.
William J. Squire
By Theo. G. Ellis, Attorney

UNITED STATES PATENT OFFICE.

WILBUR J. SQUIRE, OF EAST HADDAM, CONNECTICUT.

IMPROVEMENT IN MACHINES FOR MAKING NETTING.

Specification forming part of Letters Patent No. 203,857, dated May 21, 1878; application filed January 14, 1878.

*To all whom it may concern:*

Be it known that I, WILBUR J. SQUIRE, of East Haddam, in the county of Middlesex and State of Connecticut, have invented certain new and useful Improvements in Machines for Making Netting; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvements relate to machines which are chiefly used for making such netting as is commonly used in fisheries; and they have for their object the successful manufacture of nets by machinery.

My invention consists in the construction, arrangement, and combination of the several parts and devices that will be hereinafter described, and in the method or manner of moving the several parts to tie the successive knots which form the netting.

Figure 1:
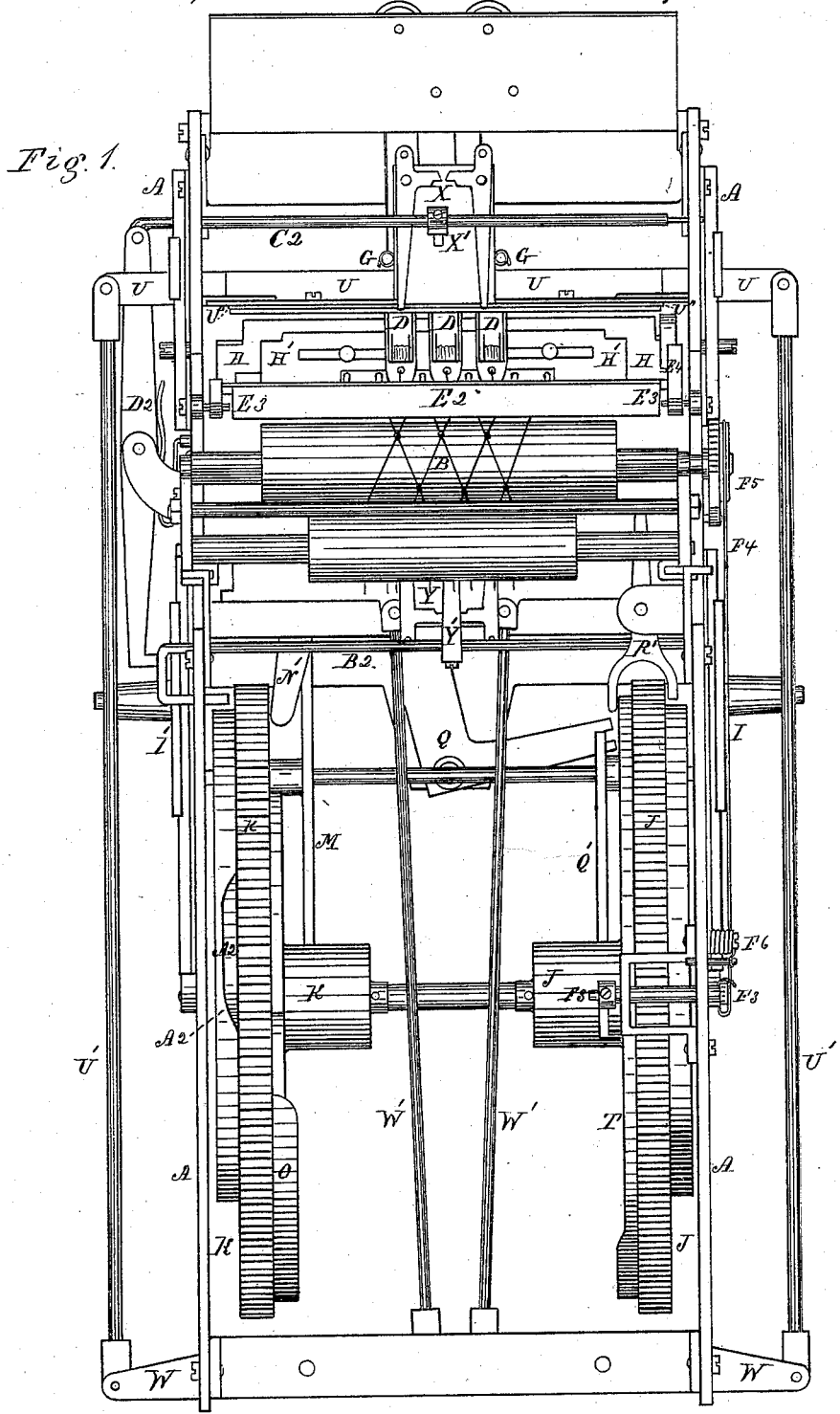
Figure 2:
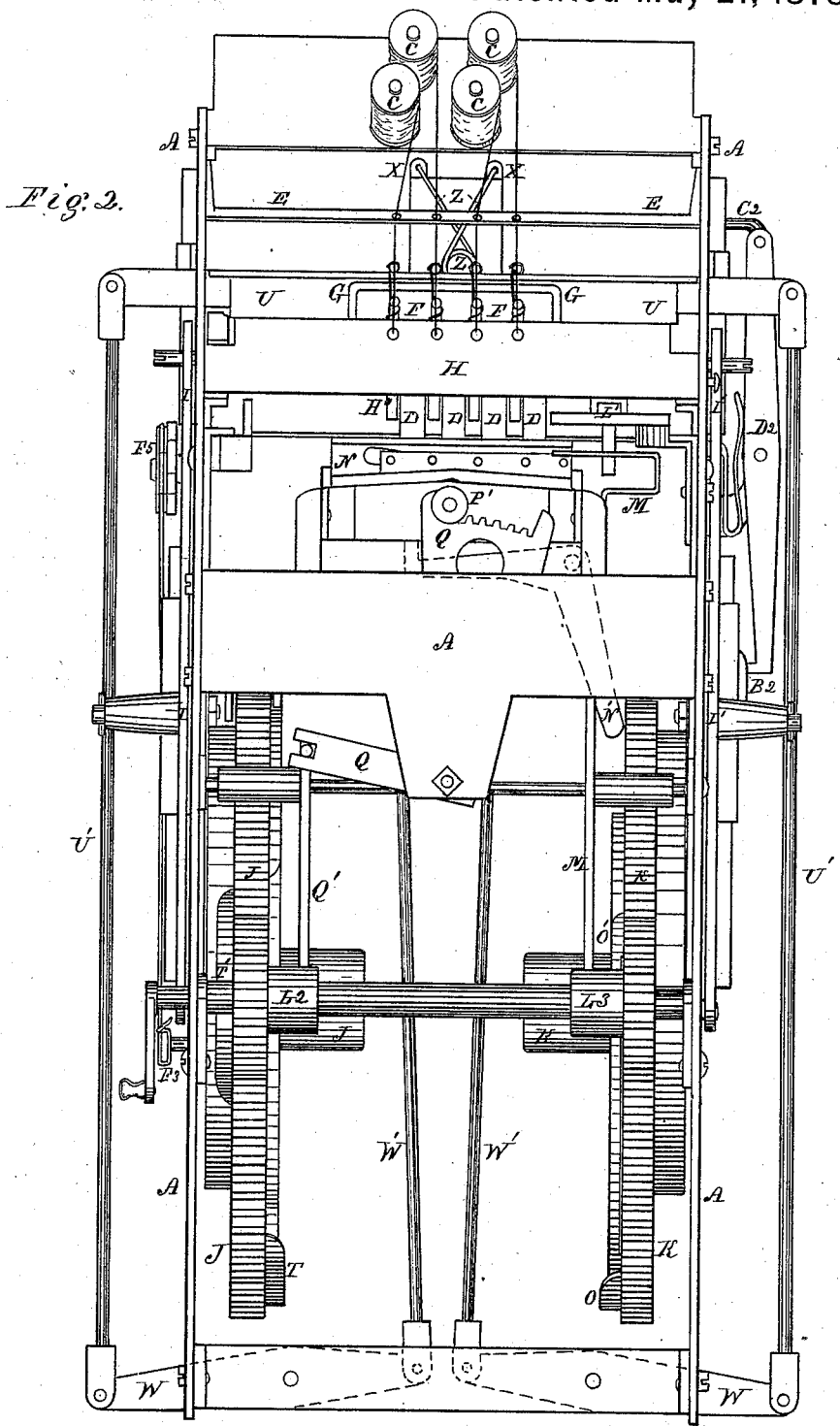
Figure 3:
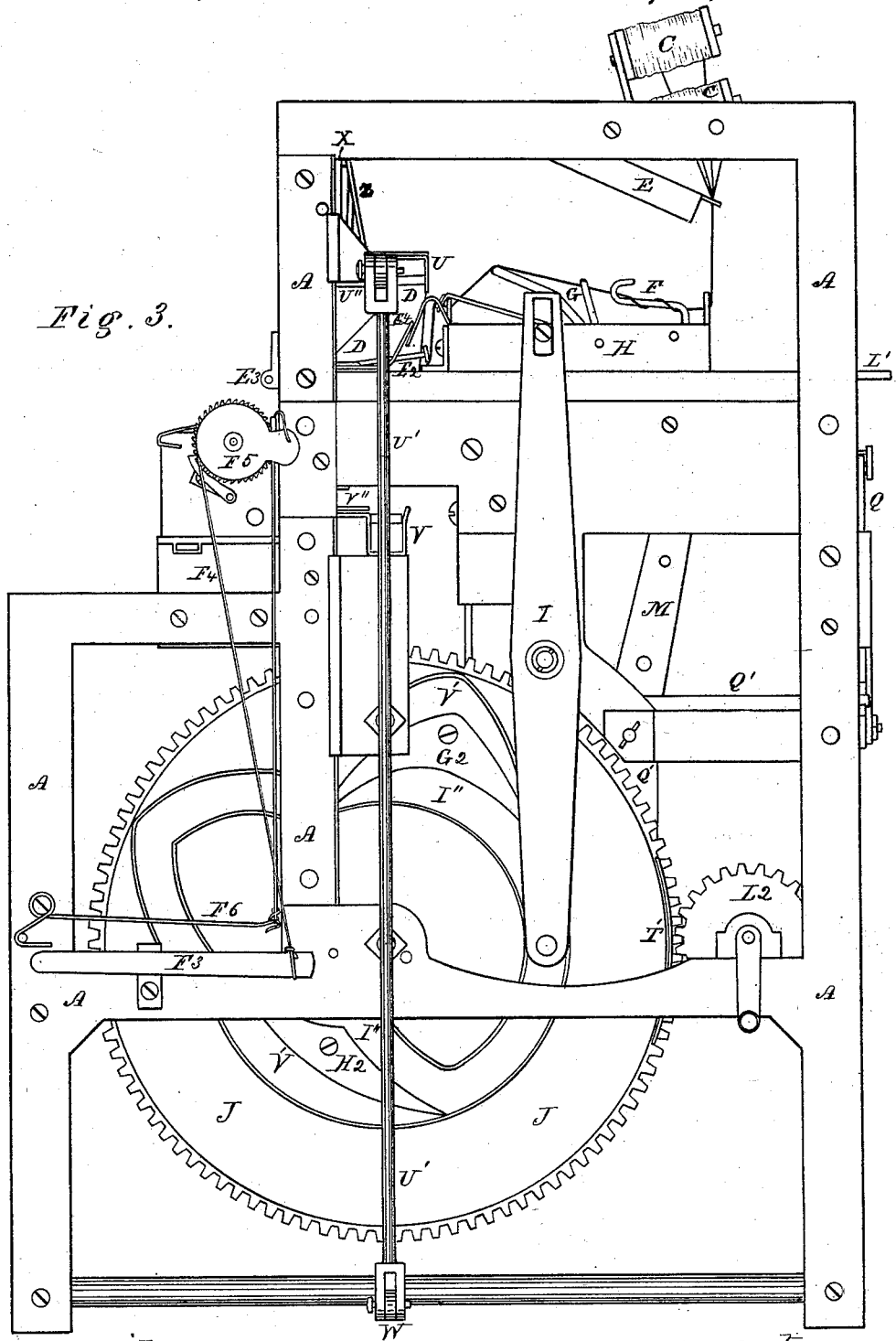
Figure 4:
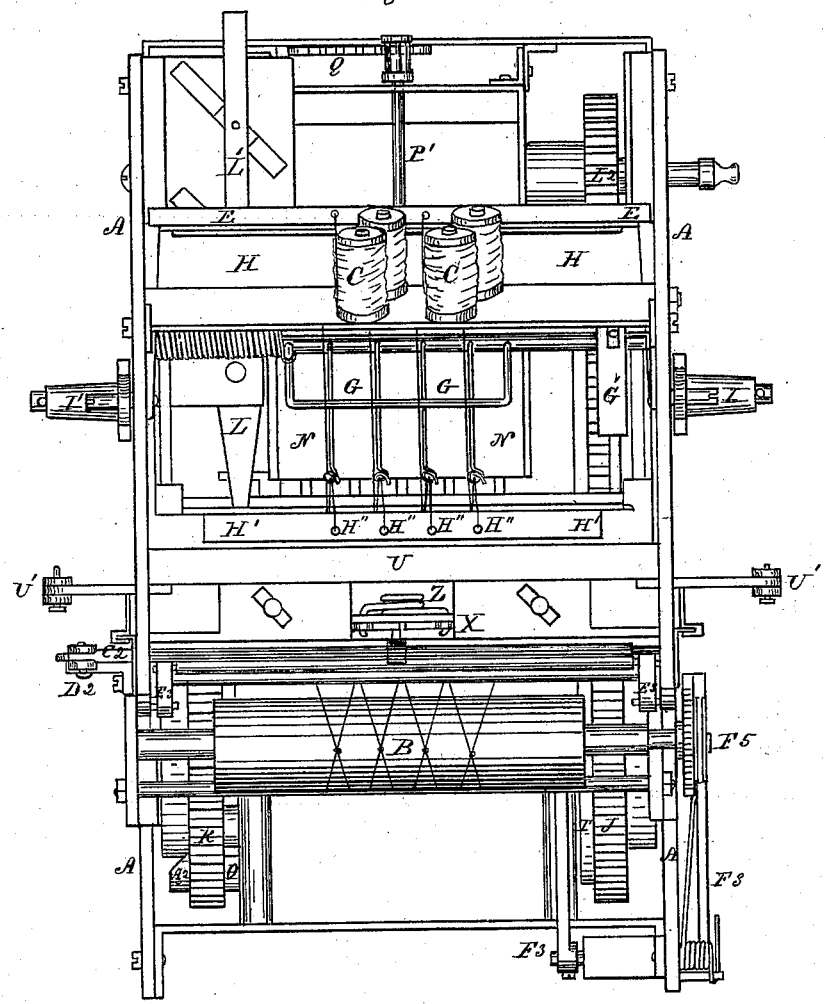
Figure 5:
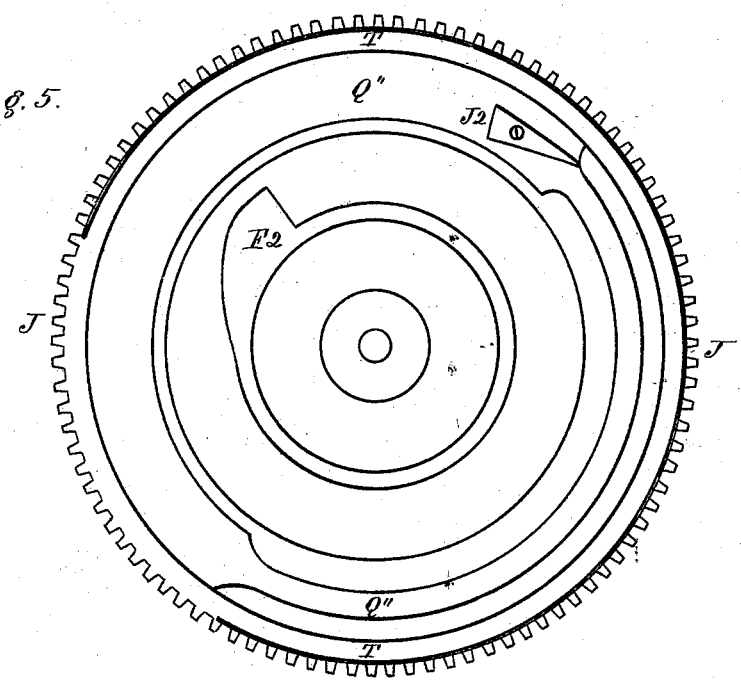
Figure 6:
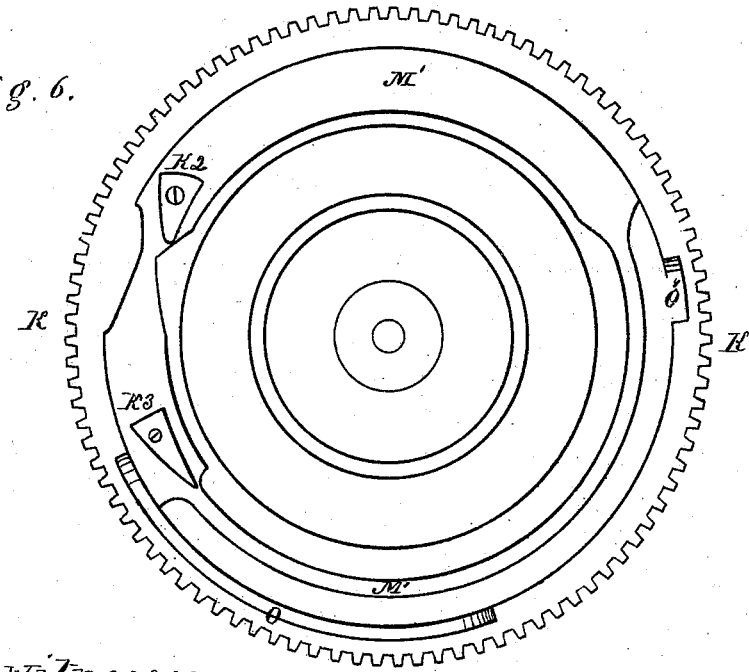

In the accompanying drawings on six sheets, Figure 1 is a front view of my improved machine. Fig. 2 is a rear view of the same. Fig. 3 is a view of the right side of the machine. The opposite side is similar and symmetrical with it, except in a few particulars, which will be explained, and which are shown in the other views. Fig. 4 is a plan or top view of the machine. Fig. 5 is an inside view of the cam-wheel on the right of the machine, the front of which is shown in Fig. 3. Fig. 6 is an inside view of the cam-wheel on the left of the machine. Fig. 7 is a section through the working parts which tie the knot. Figs. 8, 9, and 10 are successive top views of the knot during the process of forming, as will be hereinafter explained.

My improved machine is intended to form a continuous web of uniform width from a series of threads or cords arranged alternately upon stationary bobbins and shuttles. The threads from the stationary bobbins are tied by bowline knots to the shuttle-threads on each side of them successively to form the meshes of the net. In order to accomplish this successfully, all the motions of the several parts which tie the knot are reversed according as the bobbin-thread is tied to the shuttle-thread to the right or left of it. This is rendered necessary by the direction in which the thread comes from the mesh last formed in the net.

A is the frame of the machine. B is a drum for holding the finished netting. C are the stationary bobbins from which the thread to form the net is taken. D are the shuttles for furnishing the intermediate threads. E is a frame for regulating the positions of the threads from the bobbins, so that the proper length shall be fed at each throw of the carriage H. F is an ordinary tension-regulator.

G is a spring take-up. This is arranged so that near the most rearward end of the throw of the carriage H the lever G′ upon the axis of the take-up strikes upon a fixed cam upon the frame of the machine, and gives a small positive take-up to tighten the knot.

The foregoing parts will be seen more particularly upon Figs. 4 and 7.

H is a sliding carriage, moving back and forth upon the fixed frame of the machine. It is operated by the rocking levers I I′, the lower ends of which move in grooves I″ in the cam-wheels J and K. Upon the front of the carriage H is a laterally-sliding thread-carrier, H′, which is furnished with the small tubes H″, through which the threads pass and by which they are guided in tying the knots. This thread-carrier receives its lateral motion from the lever L, the rear end of which runs upon the guide L′ as the carriage H moves back and forth. The guide L′ has a parallel motion in slots in the frame, and is operated by the lever M, the lower end of which runs in the groove M′ in the cam-wheel K. These parts are seen more particularly in Figs. 2, 4, and 6.

N is a rocking frame, hinged at its rear end, and having a small vertical movement at its forward end. This movement is given to it by the bent lever N′, which is operated by the raised cams upon the cam-wheel K. (Marked O and O′.) The cam O raises the frame while the thread is being passed around the hooks to form the knot, and drops it when the hooks are turned over. The cam O′ raises the frame when the hooks are turned back again, and drops to release the thread when the knot is finished.

P is a series of hooks, around which one end of the loops are passed to form the knots. These hooks rotate in bearings in the frame N, and are connected at their rear ends by a plate, which carries a crank upon the rear end of each hook, the crank-pins entering the plate. By means of this they are all rotated together when the plate is moved. This plate receives a rotating motion from a crank upon the end of the spindle P′, driven by a pinion, as shown in Figs. 2, 4, and 7. This pinion is operated by a rack upon the bent lever Q, which is rocked back and forth by the lever Q′, the lower end of which runs in the groove Q″ upon the inside of the cam-wheel J.

R shows a series of pins, around which the thread is passed to form the knot. These pins are attached to a plate, so that they all move together and project up through the fixed plate S, which forms part of the frame of the machine. The plate to which the pins are attached has inclined grooves, in which studs upon a horizontally-moving bar work so as to move the pin-plate up and down. This bar is operated by the rocking lever R′, which is thrown back and forth by the raised cams T and T′ on the cam-wheel J. The cam T upon the inside of the wheel throws the pins up to form the knot, and the cam T′ on the outside of the wheel throws them down to release the thread after the knot is formed. The shuttles D are carried up and down, so as to pass through the knot while it is being formed, by means of the two shuttle-carriers U and V. These approach and recede from each other simultaneously. They approach near enough to each other to take in the hooked ends of the shuttles, and recede far enough to enable the shuttle to clear the knot. The lower shuttle-bar receives its vertical motion from the grooves V′ upon the outside of each of the cam-wheels J and K. The upper shuttle-bar has its motion communicated to it from the lower by means of the vertical connecting-rods U′ and W′ and the rocking lever W. They thus move simultaneously and in opposite directions. The shuttles are held in the shuttle-bars by means of sliding locking-plates U″ and V″. These plates are moved so as to lock and unlock the shuttles when required. In Fig. 7 the shuttle is shown locked into the lower bar.

The locking-plates are operated by the small bent levers shown at X and Y. (See Figs. 1, 2, and 4.) The ends of the vertical arms of these small levers rest in a slot in the locking-bar, and are held outward in contact with the end of the slot by means of springs Z. Motion is given to the small levers X and Y by the dogs X′ and Y′, which come in contact with the short interior arms of the levers as the shuttle-bars ascend and descend. The dogs strike the short arms of the levers alternately when the shuttle-bars are nearest together, so as to unlock one bar while the other is locked, in this way passing the shuttles from one bar to the other each time they come together. The locking-plates are moved by the force of the small springs Z back of the levers, and motion is communicated by the dogs X′ and Y′ releasing one lever, while the spring of the opposite one acts upon the locking-plate. The locking-plate moves in diagonal slots, so that the longitudinal throw given by the small levers moves it in or out, to lock or unlock the shuttles. When the dog strikes either of the right-hand levers, Fig. 1, it locks the shuttles in the bar, and when it strikes either of the left-hand ones it unlocks them, so that they can shift to the other shuttle-bar. The dogs therefore require to be moved to the right and left in opposite directions, so as to change the shuttles from one bar to the other at each movement. This motion is communicated by the cam $A^2$ to the dog-bar $B^2$, and thence to the dog-bar $C^2$ by means of the rocking lever $D^2$.

In order to guide the shuttles when passing up or down, there is a horizontal rack, $E^2$, which extends across the machine, and is hinged at its front edge at $E^3$. This rack turns up out of the way as the carriage H advances to the front, being operated by the lever $E^4$, which comes in contact with a proper stop or dog upon the carriage.

The roller B, which takes up the finished netting after the knots are tied, receives an intermittent motion through a certain angle at each revolution of the cam-wheel J by means of the cam $F^2$. This cam operates upon the inner arm of the double lever $F^3$, and draws down the cord $F^4$ attached to the outer arm, thereby turning the ratchet-wheel $F^5$ attached to the end of the roller B. The pawl of the ratchet is returned to its position without turning the roller by means of the spring $F^6$.

The two cam-wheels J and K have upon their outer surfaces the cam-grooves V′ and I″, as before described. These grooves are coincident for a portion of their circumference, but vary in certain parts, as shown in Fig. 3. There are two switches, $G^2$ and $H^2$, which always direct the lower end of the lever I inside of them, and the lower end of the shuttle-carrier outside of them. This is readily seen, as the parts follow each other, and the switch is always left for the succeeding part to follow the channel not before taken.

The inside of the cam-wheel J, it will be observed, has a switch, $J^2$, in the cam-groove Q″. This is for the purpose of reversing the motion of the lever Q′, which turns the hooks P, so that in one revolution of the wheel J the end of the lever will pass outside of the switch, and in the succeeding revolution it will pass inside of the switch, thus turning the hook over in opposite directions for each alternate knot.

In the cam-groove M′, upon the inside of the wheel K, are two similar switches, $K^2$ and $K^3$. These are for the purpose of throwing the lower end of the lever M to the outside and inside of them in successive revolutions of the cam-wheel. This operates the sliding thread-carrier H', so that the thread is passed around the hooks P and the pins R in reverse directions at successive revolutions of the wheel K. In one case it is passed around in the form of the letter S, and in the other in the form of the letter Z.

The method of tying the nots is shown in Figs. 7, 8, 9, and 10. In Fig. 7 the parts are in the same position as in Fig. 8. The thread, coming from the already-formed netting and passing up through the tube H', is carried by the motions of the tube around the hook P and the pin R in the form of an S, as shown in Fig. 8. The hook then turns over, as shown in Fig. 9. The shuttle then passes up through the turned-over loop. The tube H'' then passes across, as shown in Fig. 10, and the shuttle descends again through the same loop, but upon the opposite side of the top thread. The hook then turns over back to its first position and drops down. This releases the knot, so that the receding of the carriage H draws it up. The pins R then drop, and the knot is finished by a small positive motion of the take-up G. This is the position of the parts and manner of tying when the bobbin-thread is tied to the shuttle-thread on its left, as shown in Fig. 1. In the next mesh the same bobbin-thread is tied to the shuttle-thread on its right, and all the motions are reversed. The thread passes around the adjacent hook and pin in the form of the letter Z or a letter S made backward, and the hook is turned over the reverse way. The shuttle passes up and down in the same manner as before, and the knot is drawn up as before.

All the parts of my improved mechanism are driven by the two wheels J and K, to which a uniform rotary motion is given by pinions $L^2$ $L^3$ upon a suitable driving-shaft, or in any other customary manner.

What I claim as my invention is—

1. The combination of the cams V' in the wheels J and K, the connecting-rods U' and W', and the rocking lever W with the shuttle-bars U V, to give them the proper motion, as herein set forth.

2. The combination of the double cams V' I'', the switches $G^2$ $H^2$, the shuttle-bar V, the lever I, and the carriage H, for giving said carriage and the shuttle-bars their proper relative motions, substantially as herein described.

3. The cam Q'', with its switch $J^2$, in combination with suitable connecting-levers and a rocking rack, Q, for communicating the rotary motion herein described to the hooks P, whereby they are alternately reversed at successive revolutions of the wheel J, substantially as set forth.

4. The combination of the cam M' and its switches $K^2$ $K^3$ with the thread-carrier H and suitable mechanism, whereby said thread-carrier receives motion in a reverse or opposite direction in alternate successive revolutions of the wheel K, substantially as herein described.

5. The combination of the cams O and O' and the lever N' with the frame N, for giving the vertical motion to said frame at the time of forming and releasing the knot, substantially as herein described.

6. The combination of the cams I I', the striding-lever R', and the pins R with suitable connecting mechanism, to throw said pins up and down to form and release the knot, substantially as herein described.

7. The combination of the cam $A^2$, the bars $B^2$ $C^2$, and the rocking lever $D^2$ and the dogs X' and Y', substantially as herein described.

8. The combination of the small levers X and their springs Z, the dog X', the locking-plate U'', and the shuttle-bar U with mechanism for operating them, substantially as and for the purpose herein described.

9. The folding rack $E^2$, in combination with the shuttles D, for guiding said shuttles as they pass through the knot, substantially as herein described.

10. The frame E, in combination with the sliding carriage H, for regulating the feed of the thread, substantially as herein described.

11. The combination of mechanism for raising, lowering, and rotating the hooks P in the manner described, mechanism for raising and lowering the pins R, as described, and mechanism for passing the shuttles D up and down through each knot with thread-carriers which describe an S, either direct or reverse, around the hooks and pins, substantially as shown and set forth.

12. The combination, in a net-making machine, with the thread-carrier and rotating hooks, of mechanism by which the said thread-carrier is caused to describe similar reversed motions around the hook and pin, and mechanism by which the said hooks are caused to rotate in reversed directions in forming successive alternate knots to the right and left, substantially as herein described.

13. The herein-described method of forming the knot—that is, by forming an S around the hook and pin, turning over the loop, passing the shuttle up through the loop, crossing over the top thread, passing the shuttle down again through the loop, and then releasing and drawing up the knot.

WILBUR J. SQUIRE.

Witnesses:
 THEO. G. ELLIS,
 JOHN T. PETERS.